(12) United States Patent
Sasaki et al.

(10) Patent No.: US 8,357,730 B2
(45) Date of Patent: Jan. 22, 2013

(54) PROCESS FOR PRODUCING FLEXIBLE POLYURETHANE FOAM

(75) Inventors: Takayuki Sasaki, Kamisu (JP); Daisuke Kaku, Kamisu (JP); Takashi Ito, Kamisu (JP); Naohiro Kumagai, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 37 days.

(21) Appl. No.: 12/429,762

(22) Filed: Apr. 24, 2009

(65) Prior Publication Data

US 2009/0215918 A1    Aug. 27, 2009

Related U.S. Application Data

(63) Continuation of application No. PCT/JP2007/070839, filed on Oct. 25, 2007.

(30) Foreign Application Priority Data

Oct. 25, 2006    (JP) .................................. 2006-290040

(51) Int. Cl.
C08L 75/08      (2006.01)
C08G 18/08      (2006.01)
C08G 18/48      (2006.01)
C08G 18/32      (2006.01)

(52) U.S. Cl. ......... 521/174; 521/137; 521/155; 521/170

(58) Field of Classification Search .................. 521/170, 521/174, 137, 155
See application file for complete search history.

(56) References Cited

U.S. PATENT DOCUMENTS

| | | | |
|---|---|---|---|
| 5,093,380 | A | 3/1992 | Takeyasu et al. |
| 6,313,060 | B1 | 11/2001 | Sugiyama et al. |
| 6,391,935 | B1 * | 5/2002 | Hager et al. ................. 521/170 |
| 6,586,486 | B2 * | 7/2003 | Falke et al. ................. 521/124 |
| 6,653,362 | B2 | 11/2003 | Toyota et al. |
| 6,734,219 | B2 | 5/2004 | Wada et al. |
| 6,756,415 | B2 | 6/2004 | Kimura et al. |
| 6,759,448 | B2 | 7/2004 | Toyota et al. |
| 6,815,467 | B2 | 11/2004 | Toyota et al. |
| 7,388,036 | B2 | 6/2008 | Sasaki et al. |
| 7,388,037 | B2 | 6/2008 | Sasaki et al. |
| 2004/0152797 | A1 | 8/2004 | Wada et al. |
| 2004/0229970 | A1 | 11/2004 | Sasaki et al. |
| 2005/0038133 | A1 * | 2/2005 | Neff et al. ................. 521/155 |
| 2006/0160913 | A1 | 7/2006 | Sasaki et al. |
| 2007/0213420 | A1 | 9/2007 | Kimura et al. |
| 2007/0219284 | A1 | 9/2007 | Sasaki et al. |
| 2008/0081846 | A1 | 4/2008 | Sasaki et al. |
| 2008/0081847 | A1 | 4/2008 | Sasaki et al. |
| 2008/0085945 | A1 | 4/2008 | Sasaki et al. |
| 2008/0114088 | A1 | 5/2008 | Sasaki et al. |
| 2008/0176970 | A1 | 7/2008 | Sasaki et al. |
| 2009/0008595 | A1 | 1/2009 | Sasaki et al. |
| 2009/0062416 | A1 | 3/2009 | Sasaki et al. |

FOREIGN PATENT DOCUMENTS

| | | |
|---|---|---|
| EP | 0 913 414 A1 | 5/1999 |
| EP | 1 995 263 A1 | 11/2008 |
| JP | 4-146916 | 5/1992 |
| JP | 5-287047 | 11/1993 |
| JP | 9-151234 | 6/1997 |
| JP | 11-286566 | 10/1999 |
| JP | 2002293867 | 10/2002 |
| JP | 2003-522235 | 7/2003 |
| JP | 2004-2594 | 1/2004 |
| JP | 2004-43561 | 2/2004 |
| JP | 2004527623 | 9/2004 |
| JP | 2004-300352 | 10/2004 |
| JP | 2004-530767 | 10/2004 |
| JP | 2006-63254 | 3/2006 |
| JP | 2006249270 | 9/2006 |
| JP | 2006282936 | 10/2006 |
| WO | WO 2006115169 A1 * | 11/2006 |

OTHER PUBLICATIONS

U.S. Appl. No. 12/719,930, filed Mar. 9, 2010, Sasaki, et al.
U.S. Appl. No. 12/732,778, filed Mar. 26, 2010, Sasaki, et al.
U.S. Appl. No. 13/419,556, filed Mar. 14, 2012, Sasaki, et al.

* cited by examiner

Primary Examiner — Michael Pepitone
(74) Attorney, Agent, or Firm — Oblon, Spivak, McClelland, Maier & Neustadt, L.L.P.

(57) ABSTRACT

To provide a flexible polyurethane foam which is excellent in low resiliency and durability without using a plasticizer and which shows little change in hardness against a change in temperature and at the same time, has high air flow.

A process for producing a flexible polyurethane foam, which comprises reacting a polyol mixture comprising the following polyol (A), the following polyol (B) and the following monool (D) with a polyisocyanate compound in the presence of a blowing agent and a foam stabilizer, at an isocyanate index of at least 90, wherein:

Polyol (A) is a polyether polyol having an average of from 2 to 3 hydroxyl groups, a hydroxyl value of from 10 to 60 mgKOH/g and an oxyethylene group content of from 0 to 30 mass %, obtained by ring-opening polymerization of an alkylene oxide to an initiator using a phosphazene compound, a Lewis acid compound or an alkali metal compound catalyst;

Polyol (B) is a polyether polyol having an average of from 2 to 3 hydroxyl groups and a hydroxyl value of from 70 to 250 mgKOH/g; and Monool (D) is a polyether monool having a hydroxyl value of from 10 to 200 mgKOH/g.

18 Claims, No Drawings

PROCESS FOR PRODUCING FLEXIBLE POLYURETHANE FOAM

TECHNICAL FIELD

The present invention relates to a process for producing a low resilience flexible polyurethane foam.

BACKGROUND ART

Heretofore, a flexible polyurethane foam having a low rebound resilience i.e. low resiliency, has been used for a shock absorber, a sound absorbent or a vibration absorber. Further, it is known that when it is used as a cushion material for chairs, mattress, etc., the body pressure distribution will be more uniform, whereby feeling of fatigue, pressure sores, etc. will be reduced. As an example, a low resilience polyurethane foam disclosed in Patent Document 1, is known.

The low resilience polyurethane foam is a low resilience polyurethane foam obtainable by reacting a composition of polyurethane foam materials comprising a polyol, a polyisocyanate, a catalyst and a blowing agent, and it has glass transition points within temperature ranges of from −70° C. to −20° C. and from 0° C. to 60° C., respectively. Further, it is disclosed that when the glass transition points are represented by peak values of tan δ obtainable by dynamic viscoelastic measurement at a frequency of 10 Hz, the peak value of tan δ within a temperature range of from −70° C. to −20° C. is at least 0.15, and the peak value of tan δ within a temperature range of from 0° C. to 60° C. is at least 0.3.

It is disclosed that the low resilience polyurethane foam has excellent low resiliency at room temperature, since it has a glass transition point within a temperature range of from 0° C. to 60° C., and there is no substantial increase in hardness at low temperatures, since it has a glass transition point within a temperature range of from −70° C. to −20° C.

However, a low resilience polyurethane foam having a glass transition point in the vicinity of room temperature has had a problem so-called temperature sensitivity such that as the working temperature departs from the glass transition point, the hardness tends to change, and the low resiliency tends to be unstable.

Further, in recent years, the level of durability required for a flexible polyurethane foam has become increasingly high. It is desired to further lower the resiliency and to develop a low resilience flexible polyurethane foam having a rebound resilience of at most 5%.

It is usually possible to lower the resiliency (rebound resilience) of a flexible polyurethane foam by incorporating a plasticizer to the flexible polyurethane foam. Accordingly, by adding Et proper amount of a plasticizer, it is possible to obtain a flexible polyurethane foam having a desired low resiliency to some extent. However, the added plasticizer is likely to elute, for example, when the flexible polyurethane foam is washed, and, for example, it has been difficult to maintain the low resiliency of the flexible polyurethane foam after washing it repeatedly.

Further, a low resilience flexible polyurethane foam usually has low air flow. That is, it is known that the air flow of a flexible polyurethane foam usually decreases as the resiliency decreases. In a case where a low resilience polyurethane foam is applied particularly to bedding, if the air flow is low, humidity (mainly released from human body) tends to be hardly dissipated, thus leading to a so-called humid state. A low resilience polyurethane foam for bedding has been required to reduce such a humid state and to dissipate the heat and humidity. Further, when the usage state of bedding is taken into consideration, as a flexible polyurethane foam is to be used in a compressed state, it is required to exhibit substantially higher air flow in a test for air flow as measured usually in a non-compressed state. Further, in consideration of the fact that it is compressed in a humid state, the durability in a humid state is required. As an index for the durability in a humid state, the wet set may be mentioned.

As a method to solve the above problems and to improve the air flow of a low resilience polyurethane foam, a method of employing a low molecular weight polyhydric alcohol as a raw material polyol has been proposed, as disclosed in Patent Documents 2 and 3. However, the low resilience polyurethane foam obtained by such a method has a problem with respect to the durability, and the restoration performance tends to gradually deteriorate. Further, in Patent Document 4, a low resilience polyurethane foam is obtained by using a polyether polyester polyol and a phosphorus-containing compound. However, the phosphorus-containing compound shows the same behavior as a plasticizer and is likely to elute from the flexible polyurethane foam, whereby it is expected to be difficult to maintain the performance is after repeating the washing.

Further, Patent Document 5 discloses a method for producing a low resilience polyurethane foam having a good air flow by using a monool in combination for the production. However, this method has a problem that the after-mentioned durability in a humidified state is poor. In Patent Documents 6 and 7, a method of employing a polyol composition containing a specific monool is proposed. However, in such a method, a low molecular weight polyether triol is used in a large amount, and the above-mentioned problem of temperature sensitivity has not yet been solved.

Further, Patent Document 8 discloses a method for producing a low resilience polyurethane foam by using a high molecular weight polyether polyol. However, this method has a problem that the air flow required property for the low resilience polyurethane foam is poor.

Patent Document 1: JP-A-11-286566
Patent Document 2: JP-A-2004-2594
Patent Document 3: JP-A-2004-43561
Patent Document 4: JP-A-9-151234
Patent Document 5: JP-A-2004-300352
Patent Document 6: JP-A-2003-522235
Patent Document 7: JP-A-2004-530767
Patent Document 8: JP-A-2006-063254

DISCLOSURE OF THE INVENTION

Object to be Accomplished by the Invention

It is an object of the present invention to provide a process for producing a flexible polyurethane foam which is excellent in low resiliency without using a plasticizer and excellent in durability and which shows little change in hardness against a temperature change (the temperature sensitivity is suppressed) and at the same time, has high air flow.

Means to Accomplish the Object

The process for producing a flexible polyurethane foam of the present invention which comprises reacting a polyol mixture with a polyisocyanate compound in the presence of an urethane-forming catalyst, a blowing agent and a foam stabilizer, is characterized in that the polyol mixture comprises the following polyol (A), the following polyol (B) and the following monool (D), and the ratio of all active hydrogen-containing compounds in all materials other than the polyisocyanate compound to the polyisocyanate compound is at least 90 by isocyanate index, wherein:

Polyol (A) is a polyether polyol having an average of from 2 to 3 hydroxyl groups, a hydroxyl value of from 10 to 60 mgKOH/g and an oxyethylene group content of at most 30 mass %, obtained by ring-opening polymerization of an alkylene oxide to an initiator using a phosphazene compound, a Lewis acid compound or an alkali metal compound catalyst;

Polyol (B) is a polyether polyol having an average of from 2 to 3 hydroxyl groups and a hydroxyl value of from 70 to 250 mgKOH/g; and Monool (D) is a polyether monool having a hydroxyl value of from 10 to 200 mgKOH/g.

Further, the proportion of the polyol (A) is preferably from 5 to 50 mass %, based on the total of the polyol (A) and the polyol (B).

Further, the proportion of the monool (D) is preferably from 1 to 30 parts by mass, based on the 100 parts by mass of the polyol (A) and the polyol (B).

Further, the polyol mixture preferably further contains at most 10 mass % of the following polyol (C), based on the entire polyol mixture:

Polyol (C) is a polyol having an average of from 2 to 6 hydroxyl groups, a hydroxyl value of from 10 to 60 mgKOH/g and an oxyethylene group content of from 50 to 100 mass %.

Further, the monool (D) is preferably a polyoxypropylene monool obtained by ring-opening polymerization of only propylene oxide to an initiator.

Further, the polyol mixture preferably further contains at most 10 mass % of the following polyol (E), based on the entire polyol mixture:

Polyol (E) is a polyol having an average of from 2 to 6 hydroxyl groups and a hydroxyl value of from 300 to 1,830 mgKOH/g.

Further, the amount of a triol in the polyol (B) contained in 100 mass % of the polyol mixture is preferably at most 40 mass %.

Further, the flexible polyurethane foam of the present invention is produced by reacting a polyol mixture with a polyisocyanate compound in the presence of an urethane-forming catalyst, a blowing agent and a foam stabilizer, characterized in that the polyol mixture comprises the following polyol (A), the following polyol (B) and the following monool (D), and the ratio of all active hydrogen-containing compounds in all materials other than the polyisocyanate compound to the polyisocyanate compound is at least 90 by isocyanate index.

Further, the flexible polyurethane foam preferably has a rebound resilience of the core of at most 15% and an air flow of from 30 to 100 L/min.

As the polyisocyanate compound, it is preferred to use at least one selected from the group consisting of tolylene diisocyanate, diphenylmethane diisocyanate, polymethylene polyphenyl polyisocyanate and derivatives thereof.

Further, as the urethane-forming catalyst, it is preferred to use at least one selected from the group consisting of a tertiary amine, a carboxylic acid metal salt and an organic metal compound.

Further, as the foam stabilizer, it is preferred to use at least one selected from the group consisting of a silicone foam stabilizer and a fluorine type foam stabilizer, and water is preferably used as the blowing agent.

Effects of the Invention

The flexible polyurethane foam of the present invention is excellent in low resiliency without using a plasticizer and excellent in durability, and it shows little change in hardness against a temperature change and at the same time has high air flow. Further, according to the process for producing a flexible polyurethane foam of the present invention, it is possible to produce a flexible polyurethane foam which is excellent in low resiliency without using a plasticizer and excellent in durability and which shows little change in hardness against a temperature change and at the same time, has high air flow.

BEST MODE FOR CARRYING OUT THE INVENTION

The flexible polyurethane foam of the present invention is produced by reacting a polyol mixture with a polyisocyanate compound in the presence of a urethane-forming catalyst, a blowing agent and a foam stabilizer. Now, the respective materials will be described.

Polyols

The polyol mixture to be used in the present invention comprises the following polyol (A), polyol (B) and monool (D). Further, it preferably contains polyol (C) and polyol (E).

Polyol (A)

The polyol (A) of the present invention is a polyether polyol (polyoxyalkylene polyol) having an average of from 2 to 3 hydroxyl groups and a hydroxyl value of from 10 to 60 mgKOH/g, obtained by ring-opening polymerization of an alkylene oxide to an initiator using a phosphazene compound, a Lewis acid compound or an alkali metal compound catalyst. That is, the polyol (A) is a polyether polyol having a polyoxyalkylene chain, obtained by ring-opening polymerization of an alkylene oxide to an initiator using a phosphazene compound, a Lewis acid compound or an alkali metal compound catalyst.

As the polymerization catalyst, a phosphazene compound, a Lewis acid compound or an alkali metal compound catalyst may be used. The Lewis acid compound may, for example, be tris(pentafluorophenyl)borane, tris(pentafluorophenyl)aluminum, tris(pentafluorophenyloxy)borane or tris(pentafluorophenyloxy)aluminum. The alkali metal compound catalyst may, for example, be an alkali metal compound such as a potassium compound such as potassium hydroxide or potassium methoxide, a cesium compound such as cesium metal, cesium hydroxide, cesium carbonate or cesium methoxide or an alkali metal hydroxide.

Among the above catalysts, a usual alkali metal such as potassium hydroxide or the cesium compound is preferred.

The alkylene oxide to be used for the production of the polyol (A) may, for example, be ethylene oxide, propylene oxide, 1,2-epoxybutane or 2,3-epoxybutane. Among them, propylene oxide, or a combination of propylene oxide and ethylene oxide is preferred. Particularly preferred is propylene oxide alone. That is, as the polyol (A), a polyoxypropylene polyol obtained by ring-opening polymerization of only propylene oxide to an initiator is preferred. It is preferred to use only propylene oxide, whereby the durability in a humidified state will be improved.

In the case where the combination of propylene oxide and ethylene oxide is used, the content of the oxyethylene group in the oxyalkylene group is preferably at most 30 mass %, particularly preferably at most 15 mass %. When the content of the oxyethylene group is within the above range, the durability in a humidified state will be improved.

As the initiator to be used for the production of the polyol (A), a compound having 2 or 3 active hydrogen atoms in its molecule may be used alone, or such compounds may be used in combination. Specific examples of the compound having 2 active hydrogen atoms include ethylene glycol, propylene glycol, 1,4-butanediol, diethylene glycol and dipropylene glycol. Further, specific examples of the compound having 3 active hydrogen atoms include glycerol and trimethylol propane. Further, it is preferred to employ a polyether polyol having a high hydroxyl value obtained by ring-opening polymerization of an alkylene oxide, preferably propylene oxide, to such a compound. Specifically, it is preferred to employ a high hydroxyl value polyether polyol (preferably polyoxypropylene polyol) having a molecular weight per hydroxyl group of from about 200 to 500, i.e. a hydroxyl value of from 110 to 280 mgKOH/g.

In the present invention, the polyol (A) has an average of 2 to 3 hydroxyl groups, preferably from 2 to 2.8. In the present invention, the average number of hydroxyl groups means an average in number of active hydrogen atoms in the initiator. By adjusting the average number of hydroxyl groups to 2 to 3, the physical properties such as the dry set of the obtainable flexible polyurethane foam can be improved. Further elongation of the obtainable flexible polyurethane foam will be excellent, and an increase in hardness can be avoided. Therefore, the physical properties such as the tensile strength will be excellent. As the polyol (A), it is preferred to employ a polyether diol having 2 hydroxyl groups in an amount of from 50 to 100 mass % based on the polyol (A), whereby the temperature sensitivity may easily be suppressed In the present invention, the polyol (A) has a hydroxyl value of from 10 to 60 mgKOH/g. By adjusting the hydroxyl value to be at least 10 mgKOH/g, it is possible to constantly produce the flexible polyurethane foam by suppressing collapse, etc. Further, by adjusting the hydroxyl value to be at most 60 mgKOH/g, it is possible to control the rebound resilience to be low without impairing the flexibility of the flexible polyurethane foam thereby produced. The hydroxyl value of the polyol (A) is more preferably from 10 to 50 mgKOH/g, most preferably from 15 to 45 mgKOH/g.

The polyol (A) in the present invention may be a polymer-dispersed polyol. The polyol (A) being a polymer-dispersed polyol means that it constitutes a dispersion system wherein the polyol (A) is a base polyol (dispersing medium), and fine polymer particles (dispersoid) are stably dispersed.

As the fine polymer particles, an addition polymerization type polymer or a condensation polymerization type polymer may be mentioned. The addition polymerization type polymer may, for example, be obtained by homopolymerizing or copolymerizing a monomer such as acrylonitrile, styrene, a methacrylate or an acrylate. Further, the condensation polymerization type polymer may, for example, be polyester, polyurea, polyurethane or polymethylol melamine. By the presence of fine polymer particles in the polyol, the hydroxyl value of the polyol can be controlled to be low, and it is effective to improve the mechanical properties such that the flexible polyurethane foam is made to be hard. The content of the fine polymer particles in the polymer-dispersed polyol is not particularly limited, but it is preferably from at most 20 mass %, more preferably at most 10 mass %, most preferably at most 5 mass %, based on the entire polyol (A). Here, various physical properties (such as the unsaturation value, the hydroxyl value, etc.) as the polyol of such a polymer-dispersed polyol are considered with respect to the base polyol excluding the fine polymer particles.

Polyol (B)

Polyol (B) of the present invention is a polyether polyol having an average of from 2 to 3 hydroxyl groups and a hydroxyl value of from 70 to 250 mgKOH/g, obtained by ring-opening polymerization of an alkylene oxide to an initiator using an alkylene oxide ring-opening polymerization catalyst.

As the alkylene oxide ring-opening polymerization catalyst, preferred is a phosphazene compound, a Lewis acid compound, an alkali metal compound catalyst or a double metal cyanide complex catalyst, and among them, the alkali metal compound catalyst is particularly preferred. The alkali metal compound catalyst may, for example, be an alkali metal compound such as a potassium compound such as potassium hydroxide or potassium methoxide or a cesium compound such as cesium metal, cesium hydroxide, cesium carbonate or cesium methoxide or an alkali metal hydroxide.

The alkylene oxide used for producing polyol (B) may, for example, be ethylene oxide, propylene oxide, 1,2-epoxybutane or 2,3-epoxybutane.

Among them, propylene oxide or a combination of propylene oxide with ethylene oxide is preferred, and particularly preferred is propylene oxide alone. As the polyol (B), when a polyoxypropylene polyol obtained by ring-opening polymerization of only propylene oxide to an initiator is used, the durability in a humidified state will be improved.

As the initiator to be used for the production of the polyol (B), a compound having 2 or 3 active hydrogen atoms in its molecule may be used alone, or such compounds may be used in combination. Specific examples of the compound having 2 or 3 active hydrogen atoms include a polyhydric alcohol such as ethylene glycol, propylene glycol, 1,4-butanediol, diethylene glycol, dipropylene glycol, glycerol or trimethylol propane; a polyhydric phenol such as bisphenol A; or an amine such as monoethanolamine, diethanolamine, triethanolamine or piperazine. Among them, the polyhydric alcohol is particularly preferred. Further, it is preferred to employ a polyether polyol having a hydroxyl value obtained by ring-opening polymerization of an alkylene oxide, preferably propylene oxide, to such a compound.

In the present invention, the polyol (B) has an average of 2 to 3 hydroxyl groups. By adjusting the average number of hydroxyl groups to 2 to 3, the physical properties such as the dry set of the obtained flexible polyurethane foam can be improved, elongation of the obtainable flexible polyurethane foam will be excellent, and the hardness will be appropriate. Therefore, the physical properties such as the tensile strength will be excellent.

The average number of the hydroxyl groups in polyol (B) is preferably from 2.0 to 2.7, more preferably from 2.0 to 2.6. By adjusting the average number of hydroxyl groups of polyol (B) within the above range, it is possible to control the rebound resilience to be low, and it is possible to obtain a flexible polyurethane foam which shows little change in hardness (the temperature sensitivity is suppressed).

Further, as the polyol (B), it is preferred to use a polyether diol having an average of 2 hydroxyl groups and a polyether triol having an average of 3 hydroxyl groups, in combination. The proportion of the polyether diol having an average of 2 hydroxyl groups in the polyol (B) is preferably at least 40 mass-1, more preferably at least 45 mass %. By adjusting the average number of hydroxyl groups within the above range, the rebound resilience can be controlled to be low, and it is possible to obtain a flexible urethane foam showing little change in hardness (having low temperature sensitivity).

In the present invention, the hydroxyl value of the polyol (B) is from 70 to 250 mgKOH/g. By adjusting the hydroxyl value to be at least 70 mgKOH/g, it is possible to constantly produce the flexible polyurethane foam by suppressing collapse, etc. Further, by adjusting the hydroxyl value to be at most 25-0 mgKOH/g, it is possible to control the rebound resilience to be low without impairing the flexibility of the flexible polyurethane foam thereby produced.

As the polyol (B), it is preferred to employ a polyol having a hydroxyl value of from 100 to 250 mgKOH/g, more preferably a polyol having a hydroxyl value of from 100 to 200 mgKOH/g.

The polyol (B) in the present invention may be a polymer-dispersed polyol. As the polymer for fine polymer particles, the same one as described above with respect to the polyol (A) may, for example, be mentioned. Further, the content of the fine polymer particles in the polymer-dispersed polyol is not particularly limited, but it is preferably from 0 to 20 mass %, more preferably from 0 to 10 mass %, most preferably from 2 to 8 mass %, based on the entire polyol (B).

Polyol (C)

Polyol (C) is a polyol having an average of from 2 to 6 hydroxyl groups, a hydroxyl value of from 10 to 60 mgKOH/g and an oxyethylene group content of from 50 to 100 mass %, which is obtained by ring-opening polymerization of an alkylene oxide to an initiator. By the use of the polyol (C), it is observed that the polyol (C) has a cell-opening effect, and addition of the polyol (C) is effective to improve the air flow. The polyol as polyol (C) may, for example, be a polyhydric alcohol, an amine having 2 to 6 hydroxyl groups, a polyester polyol, a polyether polyol or a polycarbonate polyol.

The alkylene oxide to be used for the production of the polyol (C) may, for example, be ethylene oxide, propylene oxide, 1,2-epoxybutane or 2,3-epoxybutane. Among them, propylene oxide or a combination of propylene oxide and ethylene oxide, is preferred. Particularly preferred is propylene oxide alone.

As the polyol (C), a polyoxypropylene polyol obtained by ring-opening addition polymerization of only propylene oxide to an initiator, is preferred, since the durability in a humidified state will thereby be improved.

The polyhydric alcohol used as an initiator may, for example, be ethylene glycol, propylene glycol, 1,4-butanediol, dipropylene glycol, glycerol, diglycerol or pentaerythritol. The amine hazing from 2 to 6 hydroxyl groups may, for example, be diethanolamine or triethanolamine. The polyether polyol may, for example, be a polyether polyol having a high hydroxyl value and obtained by ring-opening polymerization of an alkylene oxide to an initiator.

The alkylene oxide used for producing polyol (C) which is a polyether polyol may, for example, be ethylene oxide, propylene oxide, 1,2-epoxybutane or 2,3-epoxybutane. Further, the content of oxyethylene in the oxyalkylene group of polyol (C) is preferably from 50 to 100 mass %, more preferably from 60 to 90 mass %. Further, as the alkylene oxide, a combination of propylene oxide with ethylene oxide is preferred. That is, polyol (C) is preferably a polyol obtained by ring-opening polymerization of a mixture of propylene oxide and ethylene oxide.

When the content of the oxyethylene group in the oxyalkylene group is at least 50 mass %, a high air flow can be maintained, when polyol (C) is added.

The average number of hydroxyl group in polyol (C) of the present invention is from 2 to 6, more preferably from 3 to 4.

Further, the hydroxyl value of polyol (C) is preferably from 10 to 60 mgKOH/g, more preferably from 15 to 50 mgKOH/g.

Monool (D)

The monool (D) in the present invention is a polyether monool having a hydroxyl value of from 10 to 200 mgKOH/g. Namely, it is a polyether monool obtained by ring-opening polymerization of an alkylene oxide to an initiator having one active hydrogen atom by means of an alkylene oxide ring-opening polymerization catalyst.

The alkylene oxide ring-opening polymerization catalyst to be used for the production of the monool (D) is preferably a double metal cyanide complex catalyst, a phosphazenium compound, a Lewis acid compound or an alkali metal compound catalyst. Among them, a double metal cyanide complex catalyst is particularly preferred. Namely, the monool (D) is preferably a polyether monool having a polyoxyalkylene chain, obtained by ring-opening polymerization of an alkylene oxide by means of a double metal cyanide complex catalyst.

As the double metal cyanide complex catalyst, one disclosed in JP-B-46-27250 may, for example, be used. As a specific example, a complex containing zinc hexacyanocobaltate as the main component may be mentioned, and its ether and/or alcohol complex is preferred. The ether may, for example, be preferably ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME). The alcohol may, for example, be preferably tert-butyl alcohol.

The alkylene oxide to be used for the production of the monool (D) may, for example, be ethylene oxide, propylene oxide, 1,2-epoxybutane or 2,3-epoxybutane. Among them, propylene oxide, or a combination of propylene oxide and ethylene oxide, is preferred. Particularly preferred is propylene oxide alone. Namely, as the monool (D), a polyoxypropylene monool obtained by ring-opening polymerization of only propylene oxide to an initiator, is preferred. The use of only propylene oxide is preferred, since the durability in a humidified state will be thereby improved.

As the initiator to be used for the production of the monool (D), a compound having only one active hydrogen atom, is used. Specifically, it may, for example, be a monool such as methanol, ethanol, n-propyl alcohol, isopropyl alcohol, n-butyl alcohol or tert-butyl alcohol; a monohydric phenol such as phenol or nonylphenol; or a secondary amine such as dimethylamine or diethylamine.

In the present invention, the monool (D) has an average of one hydroxyl group. Further, the monool (D) has a hydroxyl value of from 10 to 200 mgKOH/g, preferably from 10 to 120 mgKOH/g.

Polyol (E)

Polyol (E) of the present invention is a polyol having an average of from 2 to 6 hydroxyl groups and a hydroxyl value of from 300 to 1,830 mgKOH/g. The polyol used as polyol (E) may, for example, be a polyhydric alcohol, an amine having 2 to 6 hydroxyl groups, a polyester polyol, a polyether polyol or a polycarbonate polyol. When polyol (E) is used, polyol (E) works as a crosslinking agent, whereby the physical properties such as hardness will be improved. In the present invention, it is observed that the polyol (E) has a cell-opening effect, and addition of the polyol (E) is effective to improve the air flow. Particularly in a case where a flexible polyurethane foam having a low density (light weight) is produced by using a large amount of a blowing agent, the blowing stability will be excellent.

The polyhydric alcohol may, for example, be ethylene glycol, propylene glycol, 1,4-butanediol, dipropylene glycol, glycerol, diglycerol or pentaerythritol. The amine having 2 to 6 hydroxyl groups may, for example, be diethanolamine or triethanolamine. The polyether polyol may, for example, be a polyether polyol obtained by ring-opening polymerization of an alkylene oxide to an initiator. The initiator used for producing polyol (E) which is a polyether polyol may, for example, be a polyhydric alcohol which may be used as polyol (E) or an initiator which may be used for producing polyol (B).

The alkylene oxide used for producing polyol (E) which is a polyether polyol may, for example, be ethylene oxide, propylene oxide, 1,2-epoxybutane or 2,3-epoxybutane. Among them, propylene oxide or a combination of propylene oxide with ethylene oxide is preferred, and propylene oxide alone is particularly preferred. That is, as polyol (E) which is a polyether polyol, a polyoxypropylene polyol obtained by ring-opening polymerization of only propylene oxide to an initiator is preferred. Among the above, polyol (E) is preferably a polyether polyol, particularly preferably a polyoxypropylene polyol. When only propylene oxide is used, the durability in a humidified state will be improved. As polyol (E), one type may be used, or more than two types may be used in combination.

The average number of hydroxyl groups of polyol (E) of the present invention is preferably from 2 to 6, more preferably from 3 to 4. Further, the hydroxyl value of polyol (E) is preferably from 300 to 1,830 mgKOH/g, more preferably from 300 to 600 mgKOH/g.

Polyol Mixture

The polyol mixture in the present invention comprises the above-mentioned polyol (A), the above-mentioned polyol (B) and the above-mentioned monool (D). Further, this polyol mixture preferably contains the above-mentioned polyol (C) and the above-mentioned polyol (E).

In the polyol mixture of the present invention, the proportions of the polyol (A) and the polyol (B) are such that the proportion of the polyol (A) to the total (100 mass %) of the polyol (A) and the polyol (B) is preferably from 5 to 50 mass %, more preferably from 10 to 30 mass %. By adjusting the proportion of the polyol (A) in the is polyol mixture to be within the above range, it is possible to obtain a flexible polyurethane foam having low resiliency and showing little change in hardness and rebound resilience against a temperature change (having low temperature sensitivity).

Further, in the polyol mixture (100 mass %), the proportion of the total of the polyol (A) and the polyol (B) is preferably at least 75 mass %, more preferably at least 80 mass %, particularly preferably at least 85 mass %. By adjusting the proportion of the total of the polyol (A) and the polyol (B) in the polyol mixture to be within the above range, it is possible to obtain a flexible polyurethane foam which is excellent in low resiliency and durability and which has good air flow.

Further, the proportion of the monool (D) is preferably from 1 to 30 parts by mass, particularly preferably from 1 to 25 parts by mass per 100 parts by mass of the total of the polyol (A) and the polyol (B). By adjusting the proportion of the monool (D) to be within the above range, it is possible to obtain a flexible polyurethane foam which is excellent in low resiliency and durability and which has good air flow.

In the polyol mixture of the present invention, the amount of a triol in the polyol (B) contained in 100 mass % of the polyol mixture is preferably at most 40 mass %, more preferably at most 35 mass %. By adjusting the amount of a triol to be within the above range, it is possible to obtain a flexible polyurethane foam having low resiliency and showing little change in hardness (having low temperature sensitivity).

Further, the proportion of the polyol (C) in the polyol mixture (100 mass %) is preferably from 0 to 10 mass %, more preferably from 0 to 8 mass %, particularly preferably from 2 to 8 mass %. By adjusting the proportion of the polyol (C) to be within the above range, it is possible to improve the air flow of the flexible polyurethane foam.

Further, the proportion of the polyol (E) in the polyol mixture (100 mass %) is preferably from 0 to 10 mass %, more preferably from 0 to 5 mass %, particularly preferably from 0 to 2 mass %. By adjusting the proportion of the polyol (E) to be within the above range, it is possible to improve the air flow while further lowering the low resiliency of the flexible polyurethane foam.

Further, in the polyol mixture in the present invention, another polyol (F) may also be used which is not classified in any of the polyol (A), the polyol (B), the polyol (C), the monool (D) and the polyol (E). The proportion of such another polyol (F) is preferably at most 10 mass %, more preferably at most 5 mass %, particularly preferably 0 mass %, in the polyol mixture (100 mass %). The proportion of such another polyol (F) being 0 mass % means that the polyol mixture comprises the polyol (A), the polyol (B) and the monool (D), and if necessary, the polyol (C) and the polyol (E), but does not contain another polyol (F).

In the present invention, a preferred composition of the polyol mixture (100 mass %) may specifically comprise, for example, from 10 to 30 mass % of the polyol (A), from 50 to 80 mass % of the polyol (B), from 0 to 8 mass % of the polyol (C), from 2 to 24 mass % of the monool (D) and from 0 to 5 mass % of and the polyol (E).

Polyisocyanate Compound

The polyisocyanate compound to be used in the present invention is not particularly limited, and it may, for example, be an aromatic, alicyclic or aliphatic polyisocyanate having at least two isocyanate groups, a mixture of at least two such polyisocyanates, or a modified polyisocyanate obtainable by modifying such a polyisocyanate.

A specific example of the polyisocyanate may, for example, be tolylene diisocyanate (TDI), diphenylmethane diisocyanate (MDI), polymethylenepolyphenyl polyisocyanate (so-called crude MDI), xylylene diisocyanate (XDI), isophorone diisocyanate (IPDI) or hexamethylene diisocyanate (HMDI). Further, a specific example of the modified polyisocyanate may, for example, be a prepolymer type modified product, a nurate modified product, a urea modified product or a carbodiimide modified product of each of the above polyisocyanates. Among them, TDI, MDI, crude MDI or a modified product thereof is preferred. Further, it is preferred to employ TDI, crude MDI or a modified product thereof (particularly preferred is a prepolymer type modified product) among them, whereby the foam stability will be improved, or the durability will be improved. Especially, it is preferred to employ a polyisocyanate compound having a relatively low reactivity among TDI, crude MDI or a modified produce thereof, whereby the air flow will be improved. Specifically, a TDI mixture wherein the proportion of 2,6-TDI is large (particularly preferably at least 15 mass %) is preferred.

The amount of the polyisocyanate compound to be used is such an amount that the proportion of all active hydrogen-containing compounds and the polyisocyanate compound in the material is at least 90 by the isocyanate index. The material comprises the polyol mixture, the polyisocyanate compound, the urethane-forming catalyst, the blowing agent and the foam stabilizer. The active hydrogen-containing compound is meant for the polyol mixture and water or the like which is useful as a blowing agent. The isocyanate index is represented by 100 times a numerical value obtained by dividing the equivalent amount of isocyanate groups in the polyisocyanate compound by the equivalent amount of the total of all active hydrogen atoms in all active hydrogen-containing compounds in the material including polyols, water, etc.

In the process for producing a flexible polyurethane foam of the present invention, the proportion of all active hydrogen-containing compounds and the polyisocyanate compound in the material is adjusted to be at least 90 by the isocyanate index. If the above proportion is at least 90 by the isocyanate index, the polyols are used appropriately, the influence as the plasticizer tends to be small, and the washing durability tends to excellent, such being desirable. Further, such is desirable also from such a viewpoint that the urethane-forming catalyst tends not to be readily dissipated, or the produced flexible polyurethane foam is unlikely to undergo a color change. The above proportion is preferably from 90 to 130, more preferably from 95 to 110, particularly preferably from 100 to 110, by the isocyanate index.

Urethane-Forming Catalyst

As the urethane-forming catalyst for the reaction of the polyol with the polyisocyanate compound, any catalyst may be used which promotes the urethane-forming reaction, and one type may be used alone, or two or more types may be used in combination. For example, as the urethane-forming catalyst, a tertiary amine such as triethylene diamine, bis(2-dimethylaminoethyl)ether or N,N,N',N'-tetramethylhexamethylene diamine, a metal carboxylate such as potassium acetate or potassium 2-ethylhexanoate, or an organic metal compound such as stannous octoate or dibutyltin dilaurate, may be mentioned.

The amount of the urethane-forming catalyst to be used is preferably from 0.001 to 5 parts by mass, more preferably from 0.01 to 3 parts by mass based on the 100 parts by mass of the polyol mixture.

Foam Stabilizer

As a foam stabilizer, a silicone foam stabilizer or a fluorinated foam stabilizer may, for example, be mentioned. Among them, the silicone foam stabilizer is preferred. Among silicone foam stabilizers, a silicone foam stabilizer containing a polyoxyalkylene/dimethylpolysiloxane copolymer as the main component, is preferred. Such a foam stabilizer composition may contain a polyoxyalkylene/dimethylpolysiloxane copolymer alone, or may contain another component in combination therewith. Such another component may, for example, be a polyalkylmethylsiloxane, a glycol or a polyoxyalkylene compound. As the foam stabilizer, a foam stabilizer composition comprising a polyoxyalkylene/dimethylpolysiloxane copolymer, a polyalkylmethylsiloxane and a polyoxyalkylene compound, is particularly preferred from the viewpoint of the stability of the foam. Such a foam stabilizer mixture may, for example, be one known by trade name SZ-1127, L-580, L-582, L-520, SZ-1919, L-5740S, L-5740M, SZ-1111, SZ-1127, SZ-1162, SZ-1105, SZ-1328, SZ-1325, SZ-1330, SZ-1306, SZ-1327, SZ-1336, SZ-1339, L-3601, SZ-1302, SH-192, SF-2909, SH-194, SH-190, SRX-280A, SRX-298, SF-2908, SF-2904, SRX-294A, SF-2965, SF-2962, SF-2961, SRX-274C, SF-2964, SF-2969, PRX-607, SZ-1711, SZ-1666, SZ-1627, SZ-1710, L-5420, L-5421, SZ-1669, SZ-1649, SZ-1654, SZ-1642, SZ-1720 or SH-193 manufactured by Dow Corning Toray Co., Ltd., F-114, F-121, F-122, F-348, F-341, F-502, F-506, F-607 or F-606 manufactured by Shin-Etsu Chemical Co., LTD, Y-10366, L-5309, L-638, L-590 or L-626 manufactured by Momentive Performance Materials Japan Inc, or B-8110, B-8017, B-4113, B-8727LF, B-8715LF, B-8404 or B-8462, manufactured by Goldschmidt. Two or more of such foam stabilizers may be used in combination, or a foam stabilizer other than the above specified foam stabilizers may be used in combination.

The amount of the foam stabilizer to be used is preferably from 0.01 to 2 parts by mass, more preferably from 0.1 to 0.5 part by mass, per 100 parts by mass of the polyol mixture.

Blowing Agent

The blowing agent is not particularly limited, and a known blowing agent such as a fluorinated hydrocarbon may be used. However, as the blowing agent to be used in the present invention, at least one member selected from the group consisting of water, oxygen and an inert gas is preferred. The inert gas may specifically be, for example, nitrogen or carbon dioxide. Among them, water is preferred. That is, in the present invention, it is particularly preferred to employ only water as the blowing agent.

When water is used, the amount of the blowing agent is preferably at most 10 parts by mass, more preferably from 0.1 to 4 parts by mass, per 100 parts by mass of the polyol mixture.

Other Additives

At the time of producing a flexible polyurethane foam of the present invention, desired additives may also be used in addition to the above-described urethane-forming catalyst, blowing agent and foam stabilizer. As such additives, a filler such as potassium carbonate or barium sulfate; a surfactant such as an emulsifier; an aging-preventive agent such as an antioxidant or an ultraviolet absorber; a flame retardant, a plasticizer, a coloring agent, an antifungal agent, a cell opener, a dispersant and a discoloration-preventive agent may, for example, be mentioned.

Foaming Method

The method for forming a flexible polyurethane foam of the present invention may be a method (mold method) wherein a reactive mixture is injected, foamed and molded in a closed mold, or a method (slab method) wherein a reactive mixture is foamed in an open system. A slab method is preferred. Specifically, foaming can be carried out by a known method such as a one shot method, a semiprepolymer method or a prepolymer method. For the production of a flexible polyurethane foam, a production apparatus commonly employed, may be used.

The liquid temperature of all materials of the mixture (polyol system) other than the polyisocyanate compound at the time of the preparation is preferably from 10 to 50° C. If the temperature is lower than 10° C., the viscosity increases, and it is difficult to mix material by stirring. If the temperature is higher than 50° C., the reaction rate becomes high, and it is difficult to control foaming. Further, the liquid temperature of the polyisocyanate compound is preferably from 10 to 50° C. Further, the mixing time of the polyol system with the polyisocyanate compound is preferably from 2 to 15 seconds.

Flexible Polyurethane Foam

The flexible polyurethane foam of the present invention is a flexible polyurethane foam produced by reacting a polyol mixture with a polyisocyanate compound in the presence of a urethane-forming catalyst, a blowing agent and a foam stabilizer, characterized in that the polyol mixture comprises the above-mentioned polyol (A), the above-mentioned polyol (B) and the above-mentioned monool (D), and the ratio of all active hydrogen-containing compounds in all materials to the polyisocyanate compound in the reaction is at least 90 by the isocyanate index.

The flexible polyurethane foam obtained by the present invention is characterized by the low resiliency, and the rebound resilience of the core is preferably at most 15%, more preferably at most 13%, particularly preferably at most 12%, most preferably at most 10%. By adjusting the rebound resilience of the core to be at most 15%, sufficient low resiliency will be provided. The lower limit is usually 0%. The measurement of the rebound resilience of the core is carried out in accordance with JIS K6400 (1997 edition). Further, the "core" in the present invention is a portion obtained by removing the skin portion from the center portion of the flexible polyurethane foam.

The flexible polyurethane foam of the present invention is characterized in that the air flow is good, and the air flow is preferably from 30 to 100 L/min, more preferably from 40 to 100 L/min, particularly preferably from 70 to 100 L/min. The air flow being within the above range means that a predetermined amount of air flow is secured even in a compressed state. That is, the flexible polyurethane foam of the present invention is less likely to be humidified when applied to bedding.

Here, the measurement of the air flow is carried out by a method in accordance with JIS K6400 (1997 edition).

The flexible polyurethane foam of the present invention is characterized in chat the durability is good. As indices for the durability, the dry set and the wet set are used. The flexible polyurethane foam of the present invention is characterized particularly in that the wet set as an index for the durability in a humidified state, is small. Here, each of the measurements of the dry set and the wet set is carried out in accordance with JIS K6400 (1997 edition). Of the flexible polyurethane foam of the present invention, the dry set is preferably at most 6%, more preferably at most 5%, particularly preferably at most 4.5%, most preferably at most 4%. Further, of the flexible polyurethane foam of the present invention, the wet set is preferably at most 5%, more preferably at most 4.5%, particularly preferably at most 4%.

The density (core density) of the flexible polyurethane foam of the present invention is preferably from 40 to 110 kg/m$^3$, more preferably from 40 to 80 kg/m$^3$. Especially, the flexible polyurethane foam of the present invention is characterized in that even with a low density, it can be foamed and produced stably and yet is excellent in durability.

Mechanism

In the present invention, when the polyol (A) has 2 hydroxyl groups and a hydroxyl value of from 10 to 60 mgKOH/g, it contains a polyol which is completely straight-chained with no branches and has an extremely long molecular chain. It is thereby possible to obtain a flexible polyurethane foam which exhibits low resiliency derived from the polyol (A) which is straight-chained and has an extremely long molecular chain and which has sufficient low resiliency, specifically the rebound resilience of the core being at most 15%.

Further, when the polyol (A) has 3 hydroxyl groups and a hydroxyl value of from 10 to 60 mgKOH/g, by selectively combining a polyol having two hydroxyl groups among the polyol (B), low resiliency can be obtained.

EXAMPLES

Now, the present invention will be described in further detail with reference to Examples, but the present invention is by no means restricted by the following Examples. Further, numerical values in Examples and Comparative Examples represent parts by mass. Further, the measurement of unsaturation values was carried out by a method in accordance with JIS K1557 (1970 edition).

Materials

Polyether polyol A1: Using a potassium hydroxide catalyst and dipropylene glycol as an initiator, propylene oxide was subjected to ring-opening polymerization, to obtain a polyoxypropylene polyol having an average of 2 hydroxyl groups and a hydroxyl value of 18 mgKOH/g.

Polyether polyol B1: Using a potassium hydroxide catalyst and dipropylene glycol as an initiator, propylene oxide was subjected to ring-opening polymerization, to obtain a polyoxypropylene polyol having an average of 2 hydroxyl groups and a hydroxyl value of 160 mgKOH/g.

Polyether polyol B2: Using a potassium hydroxide catalyst and glycerol as an initiator, propylene oxide was subjected to ring-opening polymerization, to obtain a polyoxypropylene polyol having an average of 3 hydroxyl groups and a hydroxyl value of 168 mgKOH/g.

Polyether polyol B3: Using a potassium hydroxide catalyst and propylene glycerol as an initiator, propylene oxide was subjected to ring-opening polymerization, to obtain a polyoxypropylene polyol having an average of 2 hydroxyl groups, a hydroxyl value of 75 mgKOH/g.

Polyether polyol C1: Using a potassium hydroxide catalyst and glycerol as an initiator, a mixture of propylene oxide and ethylene oxide was subjected to ring-opening polymerization, to obtain a polyoxypropyleneoxyethylene polyol having an average of 3 hydroxyl groups, a hydroxyl value of 48 mgKOH/g and a total oxyethylene group content of 80 mass %.

Polyether monool D1: Using n-butyl alcohol as an initiator, propylene oxide was subjected to ring-opening polymerization by using zinc hexacyanocobaltate-tert-butyl alcohol complex catalyst, to obtain a polyoxypropylene monool having an average of 1 hydroxyl group and a hydroxyl value of 16.7 mgKOH/g.

Polyether monool D2: Using n-butyl alcohol as an initiator, propylene oxide was subjected to ring-opening polymerization by using a potassium hydroxide catalyst, to obtain a polyoxypropylene monool having an average of 1 hydroxyl group and a hydroxyl value of 22 mgKOH/g.

Polyether polyol E1: Using a potassium hydroxide catalyst and pentaerythritol as an initiator, propylene oxide was subjected to ring-opening polymerization, to obtain a polyoxypropylene polyol having an average of 4 hydroxyl groups and a hydroxyl value of 410 mgKOH/g.

Blowing agent: Water

Catalyst A: Tin 2-ethylhexanoate (tradename: DABCO T-9, manufactured by Air Products and Chemicals, Inc.)

Catalyst B: Dibutyltin dilaurate (tradename: NEOSTANN U-100, manufactured by Nitto Kasei Co., Ltd.)

Catalyst C: Solution of triethylenediamine in dipropylene glycol (tradename: TEDA-L33, manufactured by TOSOH CORPORATION)

Foam stabilizer A: Silicone foam stabilizer (tradename: L-5740S, manufactured by Dow Corning Toray Co., Ltd.)

Polyisocyanate compound a: TDI-80 (mixture of 2,4-TDI/2,6-TDI=80/20 mass %), isocyanate group content: 48.3 mass % (tradename: CORONATE T-80, manufactured by Nippon Polyurethane Industry Co., Ltd.)

Examples 1 to 11

A mixture (polyol system) of all materials other than the polyisocyanate compound among the materials and blend agents shown in Tables 1 and 2, was adjusted to a liquid temperature of 21° C.±1° C., and the polyisocyanate compound was adjusted to a liquid temperature of 21±1° C. To the polyol system, the polyisocyanate compound was added in a prescribed amount, followed by mixing for 5 seconds by a mixer (rotational speed: 1,425 rpm), and the mixture was injected at room temperature into a wooden box of 300 mm×300 mm×300 mm with an open top and lined with a plastic sheet, to prepare a flexible polyurethane foam (slab foam). The prepared flexible polyurethane foam was taken out and left to stand for 24 hours in a room adjusted to have room temperature (23° C.) and a humidity of 50%, whereupon various physical properties were measured. The measured results are shown in Tables 1 and 2. Here, Examples 1 to 9 and 11 are Examples of the present invention, and Example 10 is a Comparative Example.

Moldability

The moldability was evaluated in such a manner that one having no shrinkage after foaming was identified by ○, and one showing shrinkage and collapse was identified by X.

Core Density, Rebound Resilience of Core

The core density and the rebound resilience of core were measured by a method in accordance with JIS K6400 (1997 edition). A sample obtained by removing the skin portion from the center portion of the foam and cutting into a size of 250 mm in length, 250 mm in width and 50 mm in height, was used for the measurement.

25% Hardness, Air Flow, Tensile Strength, Elongation, Dry Set, Wet Set

The 25% hardness (ILD), air flow, tensile strength, elongation, dry set and wet set were measured by methods in accordance with JIS K6400 (1997 edition). Further, the air flow was measured by a method in accordance with method B of JIS K6400 (1997 edition).

However, measurements of the 25% hardness, air flow and rebound resilience of core, were carried out after crushing by a hand.

CLD Hardness, Change in Hardness

The CLD hardness was measured by a method in accordance with JIS K6400 (1997 edition). However, the temperature for the measurement was room temperature (23° C.). Further, the change in hardness was calculated from the CLD hardness measured at room temperature (23° C.) and the CLD hardness measured at a low temperature (5° C.). Namely, the proportion (%) of the increase in the CLD hardness measured at 5° C. against the CLD hardness measured at 23° C. was obtained.

TABLE 1

|  | Ex. 1 | Ex. 2 | Ex. 3 | Ex. 4 | Ex. 5 | Ex. 6 |
|---|---|---|---|---|---|---|
| Polyol A1 | 27.8 | 27.8 | 27.8 | 27.8 | 27.8 | 27.8 |
| Polyol B1 | 38.9 | 38.9 | 38.9 | 38.9 | 38.9 | 38.9 |
| Polyol B2 | 28.6 | 28.6 | 28.6 | 28.6 | 28.6 | 28.6 |
| Polyol C1 |  |  |  |  |  |  |
| Monool D1 | 4.8 |  | 4.8 |  | 4.8 |  |
| Monool D2 |  | 4.8 |  | 4.8 |  | 4.8 |
| Blowing agent | 1.33 | 1.33 | 1.33 | 1.33 | 1.33 | 1.33 |
| Catalyst A |  |  | 0.04 | 0.04 |  |  |
| Catalyst B |  |  |  |  | 0.04 | 0.04 |
| Catalyst C | 1.43 | 1.43 | 0.29 | 0.29 | 0.29 | 0.29 |
| Foam stabilizer A | 0.29 | 0.29 | 0.29 | 0.29 | 0.29 | 0.29 |
| Polyisocyanate compound a | 102 | 102 | 102 | 102 | 102 | 102 |
| Isocyanate index |  |  |  |  |  |  |
| Moldability | ○ | ○ | ○ | ○ | ○ | ○ |
| Density (kg/m$^3$) | 63.8 | 63.3 | 60.4 | 60.2 | 56.6 | 56.1 |
| Rebound resilience of core (%) | 7 | 6 | 8 | 8 | 10 | 11 |
| Air flow (L/min) | 31.5 | 33.3 | 68.8 | 66.3 | 44.5 | 49.3 |
| 25% ILD (N/314 cm$^2$) | 40 | 41 | 61 | 59 | 59 | 60 |
| CLD hardness (N/cm$^2$) | 0.118 | 0.115 | 0.162 | 0.167 | 0.155 | 0.157 |
| Change in hardness (%) | 9.3 | 9.1 | 7.2 | 7.6 | 7.5 | 6.9 |

TABLE 1-continued

|  | Ex. 1 | Ex. 2 | Ex. 3 | Ex. 4 | Ex. 5 | Ex. 6 |
|---|---|---|---|---|---|---|
| Tensile strength (kPa) | 59 | 63 | 61 | 60 | 62 | 64 |
| Elongation (%) | 251 | 273 | 223 | 236 | 195 | 232 |
| Dry set (%) | 4.7 | 4.8 | 2.3 | 2.6 | 3.7 | 4.1 |
| Wet set (%) | 3.6 | 3.7 | 1.7 | 2.1 | 4.4 | 3.3 |

TABLE 2

|  | Ex. 7 | Ex. 8 | Ex. 9 | Ex. 10 | Ex. 11 |
|---|---|---|---|---|---|
| Polyol A1 | 26.3 | 26.3 | 26.3 |  | 27.8 |
| Polyol B1 | 36.8 | 36.8 | 36.8 | 8.8 |  |
| Polyol B2 | 27.0 | 27.0 | 25.2 | 86.1 | 28.6 |
| Polyol B3 |  |  |  |  | 38.9 |
| Polyol C1 | 5.4 | 5.4 | 5.4 |  |  |
| Monool D1 | 4.5 |  | 4.5 | 5.1 | 4.8 |
| Monool D2 |  | 4.5 |  |  |  |
| Polyol E1 |  |  | 1.8 |  |  |
| Blowing agent | 1.33 | 1.33 | 1.33 | 1.33 | 1.33 |
| Catalyst A |  |  | 0.04 | 0.04 |  |
| Catalyst B | 0.04 | 0.04 |  |  |  |
| Catalyst C | 0.29 | 0.29 | 0.29 | 0.29 | 1.43 |
| Foam stabilizer A | 0.29 | 0.29 | 0.29 | 0.29 | 0.29 |
| Polyisocyanate compound a | 102 | 102 | 102 | 102 | 102 |
| Isocyanate index |  |  |  |  |  |
| Moldability | ○ | ○ | ○ | X | ○ |
| Density (kg/m$^3$) | 56.8 | 55.7 | 63.1 | shrink-age | 59.7 |
| Rebound resilience of core (%) | 11 | 13 | 12 |  | 15 |
| Air flow (L/min) | 67.8 | 81.8 | 34.5 |  | 41.5 |
| 25% ILD (N/314 cm$^2$) | 48 | 46 | 48 |  | 53 |
| CLD hardness (N/cm$^2$) | 0.126 | 0.127 | 0.118 |  | 0.127 |
| Change in hardness (%) | 4.8 | 4.7 | 6.6 |  | 7.8 |
| Tensile strength (kPa) | 68 | 58 | 63 |  | 53 |
| Elongation (%) | 275 | 257 | 222 |  | 168 |
| Dry set (%) | 3.2 | 4.3 | 2.0 |  | 5.5 |
| Wet set (%) | 3.0 | 3.3 | 1.6 |  | 4.7 |

With the flexible polyurethane foams in Examples 1 to 9 and 11 prepared by using the specific polyols (A), (B) and monool (D), as shown in Tables 1 and 2, the rebound resilience is at most 15%, and the change in hardness by a temperature change is little. Further, they are excellent also in mechanical properties such as tensile strength and elongation. Further, the dry set and wet set as an index for the durability is as small as at most 5%, and thus, the durability is good. Further, the air flow is also at least 30 L/min, thus showing that flexible polyurethane foams having very high air flow were obtained.

Here, the physical properties evaluations are blanc in Example 10, because the urethane foam did not shrink at the stage of molding, and a sample for measuring the physical properties could not be obtained.

INDUSTRIAL APPLICABILITY

The flexible polyurethane foam obtained by the present invention has low resilience, and it is suitable as a shock absorber, a sound absorbent or a vibration absorber, and also suitable for bedding, mats, cushions, seat cushions for automobiles, backing materials or skin wadding materials by frame lamination. It is particularly suitable for bedding (mattress, pillows, etc.)

The entire disclosure of Japanese Patent Application No. 2006-290040 filed on Oct. 25, 2006 including specification, claims and summary is incorporated herein by reference in its entirety.

What is claimed is:

1. A process for producing a flexible polyurethane foam, which comprises reacting a polyol mixture with a polyisocyanate compound in the presence of an urethane-forming catalyst, a blowing agent and a foam stabilizer, characterized in that the polyol mixture comprises the following polyol (A), the following polyol (B) and the following monool (D), and the ratio of all active hydrogen-containing compounds in all materials other than the polyisocyanate compound to the polyisocyanate compound is at least 90 by isocyanate index, wherein:

Polyol (A) is a polyoxypropylene polyol having an average of from 2 to 3 hydroxyl groups, a hydroxyl value of from 10 to 60 mgKOH/g and is obtained by ring-opening polymerization of only propylene oxide to an initiator using a phosphazene compound, a Lewis acid compound or an alkali metal compound catalyst;

Polyol (B) is a polyoxypropylene polyol having an average of from 2 to 3 hydroxyl groups and a hydroxyl value of from 70 to 250 mgKOH/g and is obtained by ring-opening polymerization of only propylene oxide to an initiator; and Monool (D) is a polyoxypropylene monool having a hydroxyl value of from 10 to 200 mgKOH/g and is obtained by ring-opening polymerization of only propylene oxide to an initiator, and wherein from 50 to 100 mass % of the polyol (A) is a polyether diol having 2 hydroxyl groups, wherein the monool (D) is present in an amount of 2-5 mass %, and wherein the polyol (C) is present in the mixture in an amount up to 10 mass % of the following polyol (C), based on the entire polyol mixture:

Polyol (C) is a polyether polyol having an average of from 2 to 6 hydroxyl groups, a hydroxyl value of from 10 to 60 mgKOH/g and an oxyethylene group content of from 50 to 100 mass %.

2. The process for producing a flexible polyurethane foam according to claim 1, wherein the proportion of the polyol (A) is from 5 to 50 mass %, based on the total of the polyol (A) and the polyol (B).

3. The process for producing a flexible polyurethane foam according to claim 1, wherein the polyol mixture further contains at most 10 mass % of the following polyol (E), based on the entire polyol mixture:

Polyol (E) is a polyol having an average of from 2 to 6 hydroxyl groups and a hydroxyl value of from 300 to 1,830 mgKOH/g.

4. The process for producing a flexible polyurethane foam according to claim 1, wherein the polyol (B) is a polyether polyol having an average of from 2 to 3 hydroxyl groups and a hydroxyl value of from 100 to 250 mgKOH/g.

5. The process for producing a flexible polyurethane foam according to claim 1, wherein the flexible polyurethane foam formed by the reacting has an air flow of 70-100 L/min.

6. The process for producing a flexible polyurethane foam according to claim 1, wherein the flexible polyurethane foam formed by the reacting has an air flow of 66.3-100 L/min.

7. The process for producing a flexible polyurethane foam according to claim 1, wherein the flexible polyurethane foam formed by the reacting has an air flow of 40-100 L/min.

8. The process for producing a flexible polyurethane foam according to claim 1, wherein Polyol (C) is present in an amount of at most 8 mass % based on 100 mass % of the polyol mixture.

9. The process for producing a flexible polyurethane foam according to claim 1, wherein the oxyethylene group content of the flexible polyurethane foam is at most 4 mass % based on 100 mass % of the polyol mixture.

10. A process for producing a flexible polyurethane foam, comprising:

reacting a polyol mixture with a polyisocyanate compound in the presence of one or more urethane-forming catalysts, one or more blowing agents and one or more foam stabilizers, wherein the polyol mixture comprises a polyol component that includes only a polyol (A), a polyol (B), a polyol (C) and a polyol (E), and a monool component that comprises a monool (D), and wherein the polyol component includes all of the polyols in the polyol mixture, wherein the ratio of all active hydrogen-containing compounds in all materials other than the polyisocyanate compound to the polyisocyanate compound is at least 90 by isocyanate index, wherein polyol (A) is a polyether polyol having an average of from 2 to 3 hydroxyl groups, a hydroxyl value of from 10 to 60 mgKOH/g and an oxyethylene group content of at most 30 mass %, obtained by ring-opening polymerization of an alkylene oxide to an initiator using a phosphazene compound, a Lewis acid compound or an alkali metal compound catalyst;

wherein polyol (B) is a polyether polyol having an average of from 2 to 3 hydroxyl groups and a hydroxyl value of from 70 to 250 mgKOH/g;

wherein polyol (C) is a polyether polyol having an average of from 2 to 6 hydroxyl groups, a hydroxyl value of from 10 to 60 mgKOH/g and an oxyethylene group content of from 50 to 100 mass %; and polyol (E) is a polyol having an average of from 3 to 6 hydroxyl groups and a hydroxyl value of 300 to 1,830 mgKOH/g; and monool (D) is a polyether monool having a hydroxyl value of from 10 to 200 mgKOH/g;

wherein the proportion of the polyol (A) is from 5 to 50 mass %, based on the total of the polyol (A) and the polyol (B).

11. The process for producing a flexible polyurethane foam according to claim 10, wherein the proportion of the polyol (A) is from 5 to 50 mass %, based on the total of the polyol (A) and the polyol (B).

12. The process for producing a flexible polyurethane foam according to claim 10, wherein the polyol mixture contains at most 10 mass % of the polyol (C) based on the entire polyol mixture.

13. The process for producing a flexible polyurethane foam according to claim 10, wherein the monool (D) is a polyoxypropylene monool obtained by ring-opening polymerization of only propylene oxide to an initiator.

14. The process for producing a flexible polyurethane foam according to claim 10, wherein the polyol mixture contains at most 10 mass % of the polyol (E) based on the entire polyol mixture.

15. The process for producing a flexible polyurethane foam according to claim 10, wherein the polyol mixture comprises from 10 to 30 mass % of the polyol (A), from 50 to 80 mass % of the polyol (B), up to 8 mass % of the polyol (C), and up to 5 mass % of the polyol (E), based on 100 mass % of the polyol mixture.

16. The process for producing a flexible polyurethane foam according to claim 10, wherein the amount of a triol in the polyol (B) contained in 100 mass % of the polyol mixture is at most 40 mass %.

17. The process for producing a flexible polyurethane foam according to claim 10, wherein from 50 to 100 mass % of the polyol (A) is a polyether diol having 2 hydroxyl groups.

18. The process for producing a flexible polyurethane foam according to claim 10, wherein the polyol (B) is a polyether polyol having an average of from 2 to 3 hydroxyl groups and a hydroxyl value of from 100 to 250 mgKOH/g.

* * * * *